United States Patent Office 3,160,635
Patented Dec. 8, 1964

3,160,635
DELTA COPPER PHTHALOCYANINE PIGMENT
AND ITS PREPARATION
Børge Ingemann Knudsen and Hans Skouenborg Rolskov, Olby Lyng pr. Koge, Denmark, assignors to Kemisk Vaerk Koge A/S, Copenhagen, Denmark, a firm
Filed Aug. 9, 1960, Ser. No. 48,424
2 Claims. (Cl. 260—314.5)

This invention relates to improved phthalocyanine pigments and more particularly to copper phthalocyanine pigments and a process for producing such pigments.

Three modifications of copper phthalocyanine differing in crystal form are known. They are all of an exceptional fastness to the light and weather. They have a considerable tinctorial strength, but differ with respect to resistance against increase in particle size in contact with certain aromatic solvents such as xylene. They also differ as to colour, the beta-modification showing a greener shade of blue than the other two. They are all very stable against the action of chemicals such as acids and alkalis.

It has now been found that there exists a further crystal modification of copper phthalocyanine which will be referred to in the following as delta-copper phthalocyanine. This modification, with respect to its resistance against crystal growth in contact with aromatic solvents behaves rather similarly to the alpha-modification, but it differs from both alpha- and gamma-copper phthalocyanine and the beta-modification in shade and in purity of the colour. Owing to the latter properties the new pigment is a valuable one the more so as the tendency to crystal growth, apart from being without importance in cases where the pigment is not brought in contact with solvents capable of promoting crystal growth, can be eliminated or effectively counteracted by known means which include mixing it with small amounts of other metal phthalocyanines than copper phthalocyanine, f. inst., phthalocyanines having magnesium, aluminum, tin, titanium or iron as central atom or mixtures of such metal phthalocyanines, with or without further admixture of basic organic substances, f. inst., amines. Also mixing with halogenated metal phthalocyanines including copper phthalocyanine has the effect of reducing the tendency of the new delta-copper phthalocyanine to recrystallize.

The new delta-modification of copper phthalocyanine gives an X-ray diffractions spectrum which shows that the crystal structure is entirely different from those of the known copper phthalocyanine pigments as in fact it appears to have no lines of high intensity in common with them.

Figure 1:
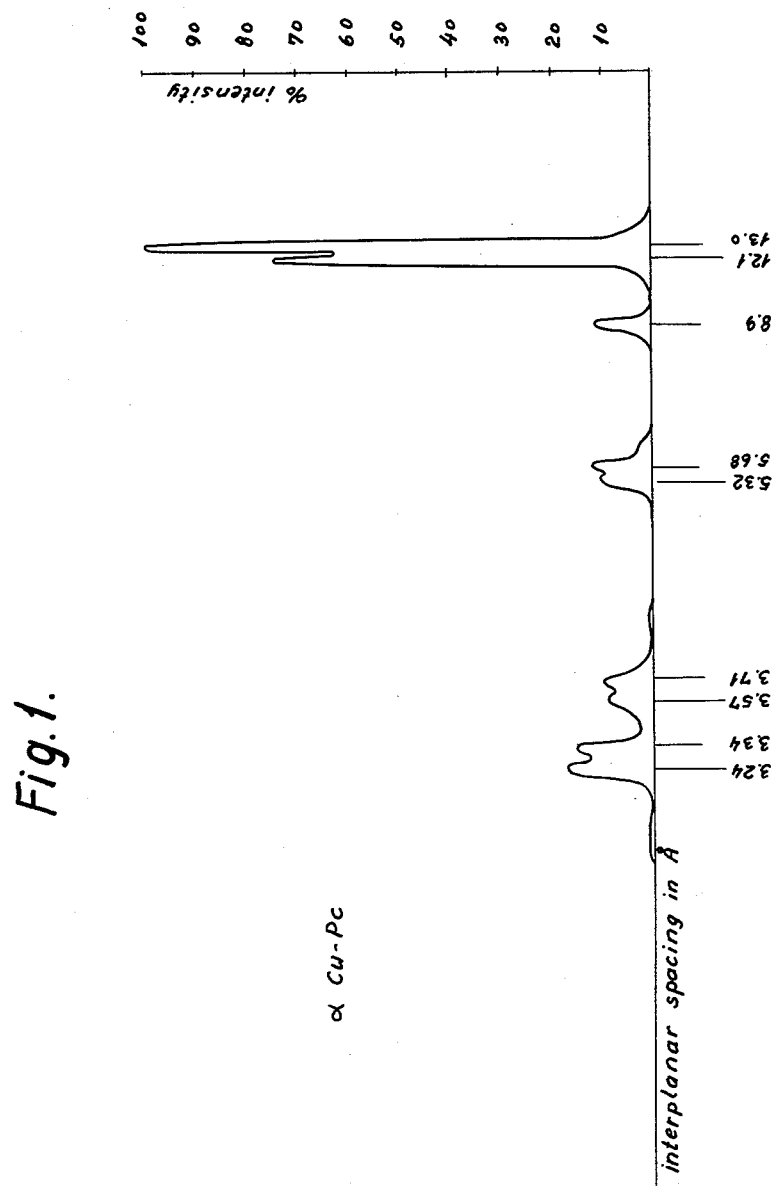
Figure 2:
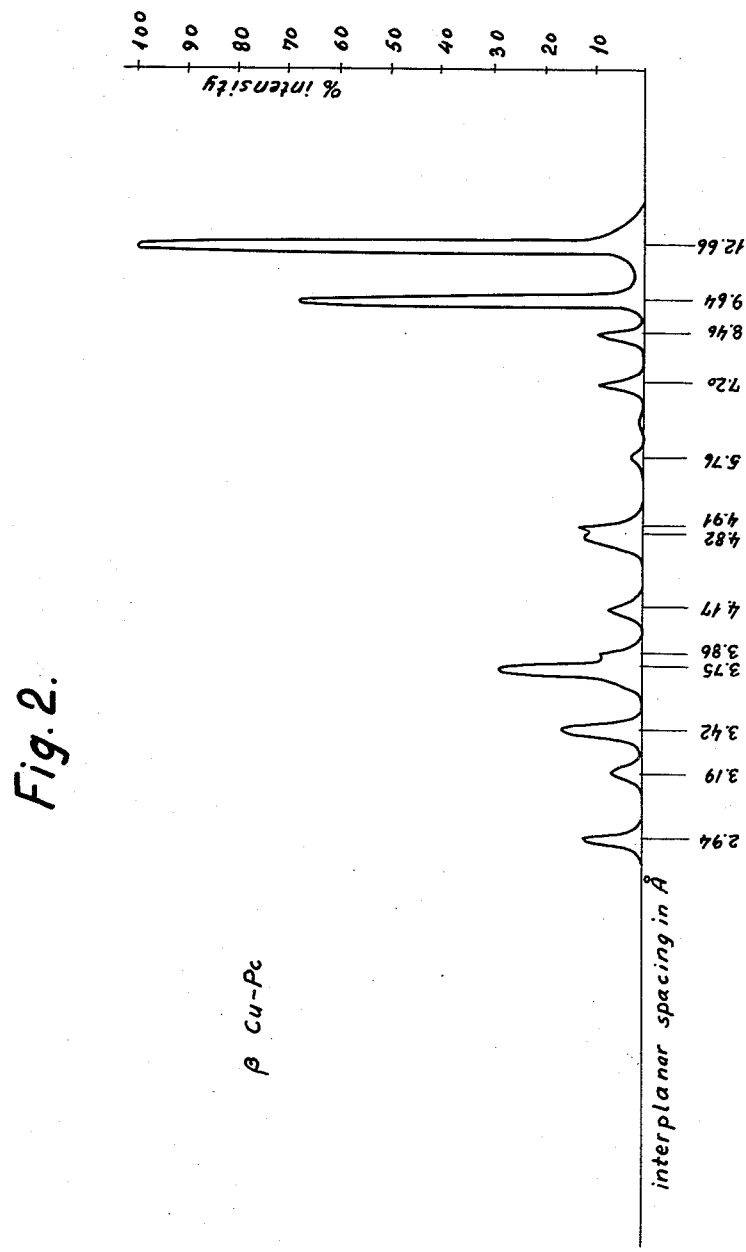
Figure 3:
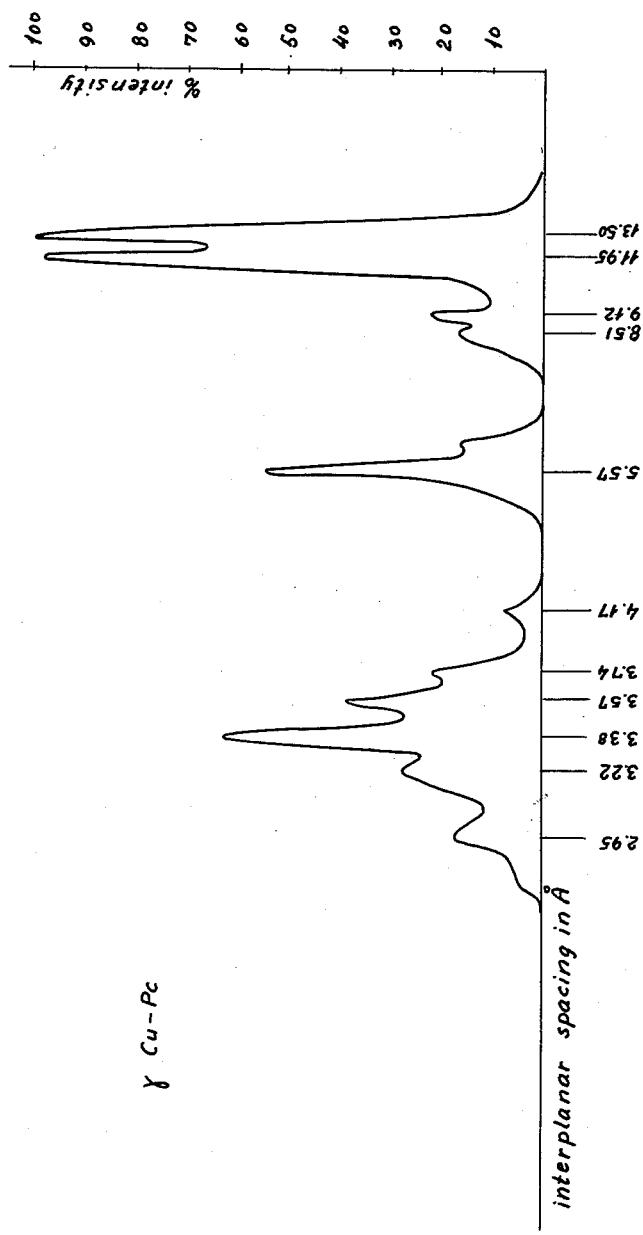
Figure 4:
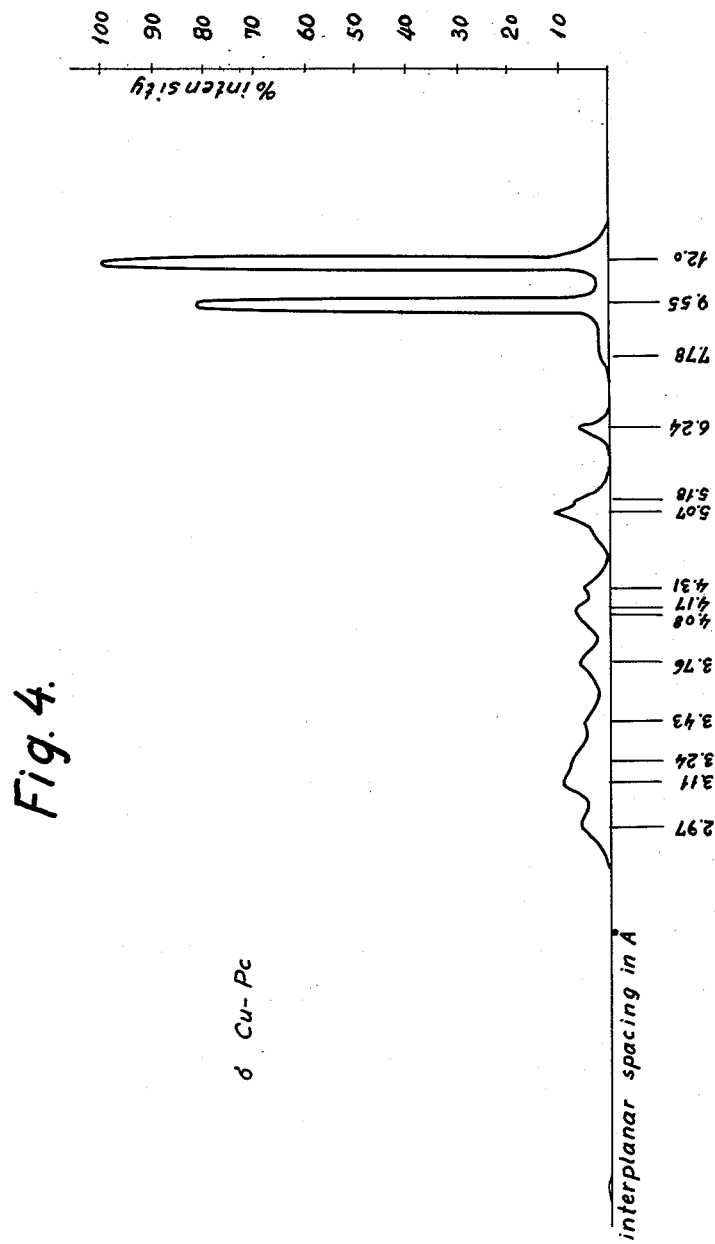
Figure 5:
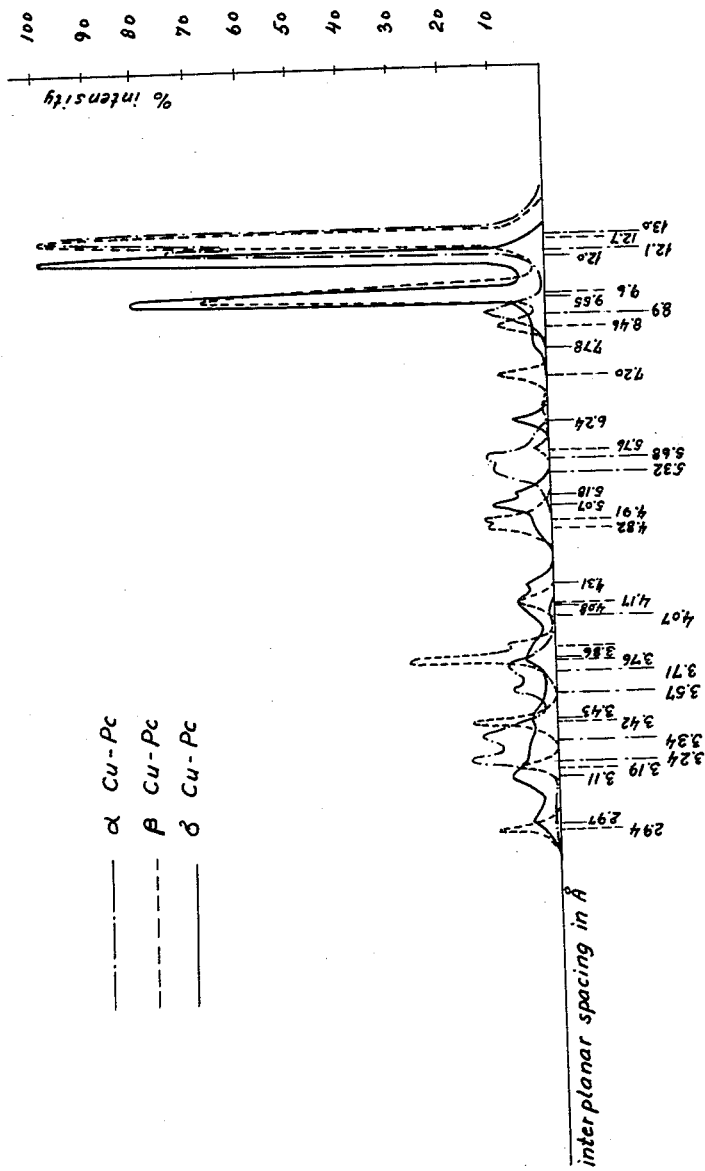

In FIGS. 1-3 of the drawing the intensity, in percent of that of the strongest line is plotted against the interplanar spacing corresponding to the wave-length of the radiation for each of the known modifications of copper phthalocyanine pigments, viz., the alpha-, beta- and gamma-modifications. Similarly in FIG. 4 the X-ray-radiogram of the new modification is given separately and in FIG. 5 together with those of the alpha- and beta-modifications respectively, the radiogram of the gamma-modification having been omitted in this case for the sake of clearness. The difference in the radiograms of the gamma- and delta-modifications can, however, easily be recognized by comparing the individual radiograms of these modifications.

From this it appears that the delta-modification has a crystal structure differing from either of the known modifications, although it has not been possible to explain the nature of the difference in crystal structure.

In the case of the alpha- and beta-modifications of copper phthalocyanine it has been possible to refind the same structure in crystals produced in a similar manner from phthalocyanines having an other central atom than copper. This has not hitherto been possible in the case of the delta-structure.

It has been found that copper phthalocyanine having alpha-structure can be produced directly by an acid milling process of the crude phthalocyanine followed by drowning the resulting mixture in water. Hereby a precipitate having excellent pigment properties results, which in the case of copper phthalocyanine is normally in the alpha-modification. It is also known that acid milling can be carried out with a smaller consumption of acid than required for dissolving all the copper phthalocyanine at a time thereby obtaining a product, whose particle size distribution and particle surface characteristics render it suitable for pigmentation and coating of printing compositions, self-supporting films and other solid objects. With this purpose in mind the raw phthalocyanine is milled, with forces predominantly shearing in nature in the form of a doughy, kneadable mass containing the raw phthalocyanine pigment, 0.5–5 parts by weight of the pigment of a water soluble inorganic salt and 0.5–2 parts by weight of a part of the pigment of a strong, normally liquid non-reactive acid having a concentration rating from 68–100%.

From this process in which the milling step has a duration which may range from as little as about 5 minutes to as much as 5 hours or more, a pigment which predominantly consists of the alpha-modification is obtained.

The delta-form will, however, be obtained in a similar acid-pasting if prior to the addition of the raw copper phthalocyanine an amount of a mild neutralizing agent is added to the acid so as to partly neutralize the same, and if a sufficient time of mechanical treatment to effect the conversion desired is given.

As a mild neutralization agent for effecting a partial neutralization in this process urea has been found valuable. The molecular ratio between urea and sulfuric acid should be within the limits 2.0 and 4. Addition of the raw copper phthalocyanine must be carried out after the partial neutralization of the sulfuric acid has been effected. The presence of milling aid, preferably an inorganic salt such as sodium chloride is necessary. If however the amount of milling aid substantially exceeds 6 times the weight of copper phthalocyanine or if it is below twice the weight of copper phthalocyanine it will not be possible to obtain the delta structure of the colour strength of the product will decrease substantially. For the mechanical treatment a powerful apparatus must be used and the consistency of the mixture to be treated must be sufficiently tough to permit sufficient power to be exerted thereon in a machine of the general kind of a dough mixer. If, however, the mixture becomes to thick and tough when using desirable quantities of urea, sulfuric acid and milling aid the toughness may be reduced by adding a small amount of water. The milling time required for obtaining the delta form is generally within the range of 6–36 hours.

Coordinate values of the various conditions will be found in the following detailed example which, however, is given by way of illustration only.

In a dough mixer capable of carrying out a powerful mechanical treatment and having a working volume of about 1 U.S. gallon are placed 350 g. urea and 295 g. sulfuric acid of 92% strength. During mixing the temperature rises and the mixture must be subjected to cooling if the temperature exceeds 80° C. Then 400 g. raw copper phthalocyanine having a purity of about 85% and produced by condensation of phthalic anhydride, urea and copper salt in the presence of a molybdenum catalyst, are added with agitation. Further 1500 g. sodium chloride in powder form is added as a milling aid and if the mixture proves to be too tough there is added a small amount of water. The amount of water is normally about 100 g. but it must be so adjusted that in the apparatus used (the idling energy consumption of which is about 1.5 amps at 380 volts) the consumption of electric energy by mixing the mixture amounts to about 2.5 amps at 380 volt.

During the mixing process cooling water is circulated through the water jacket of the mixer to keep the temperature at about 50–60° C. After treating in this manner for about 18 hours the resulting mixture is poured into 17 litres of water, so that about 20 g. copper phthalocyanine will be contained in each liter of water. The suspension obtained is heated to boiling under agitation and filtered. The filter-cake is washed free from acid and chloride and dried at 60° C. The pigment obtained has the X-ray diffraction pattern represented in FIG. 4 of the drawing. It has a greater tinctorial strength than hitherto known phthalocyanine pigment. Thus the tinctorial strength is 25% greater than that of the pigments the alpha structure usually commercially available. The hue is more reddish blue than that of alpha-phthalocyanine and it has a high transparency. The new product yields prints and paints of unusual brilliance.

In order to compare the hue and purity of a pigment of the alpha type with the present one a printing ink is manufactured from one part of each of the copper phthalocyanine pigments to be compared with two parts of printing ink. This printing ink is then mixed with a toning paste consisting of 2.5 parts of zinc-oxide and 1 part of lithographic varnish in such a proportion that the ratio between the phthalocyanine pigment and the zinc-oxide is 1:50. From the mixture there is produced a draw-down on paper. After drying each of the samples are measured in reflected light in the spectrophotometer; from the spectrograms dominant wavelengths and purity are determined by known methods (for instance NBS Circular Number 478).

The result from comparing two such samples appears from the following table in which I represents a sample produced from the pigment having delta structure and produced in accordance with the abovenamed example and II represents sample produced by means of an alpha copper-phthalocyanine pigment chosen among the most reddish products commercially available.

*Table*

| Pigment | Dominant wavelength, A. | Purity, percent |
| --- | --- | --- |
| I | 4,729 | 68 |
| II | 4,744 | 66.6 |

In the following table the interplanar spaces corresponding to a number of characteristic lines of the X-ray diffraction pattern of the new delta phthalocyanine pigment, a pigment of alpha structure and a pigment of beta structure are listed. The lines *underlined* are thought particularly characteristic of the new product.

*Table*

| Delta form | | Alpha form | | Beta form | |
| --- | --- | --- | --- | --- | --- |
| A | Intensity in percent | A | Intensity in percent | A | Intensity in percent |
| *12.0* | 100 | 13.0 | 100 | 12.7 | 100 |
| *9.55* | 82 | 12.1 | 75 | 9.64 | 68 |
| 7.78 | 2 | 8.9 | 12 | 8.5 | 9 |
| *6.24* | 7 | 5.68 | 12 | 7.2 | 9 |
| *5.18* | 7 | 5.32 | 10 | 4.91 | 13 |
| *5.07* | 11 | 3.71 | 10 | 4.82 | 12 |
| 4.31 | 5 | 3.57 | 9 | 4.17 | 7 |
| 4.17 | 7 | 3.34 | 15 | 3.75 | 29 |
| 4.08 | 6 | 3.24 | 17 | 3.42 | 17 |
| 3.76 | 6 | | | 3.19 | 6 |
| 3.43 | 5 | | | 2.94 | 12 |
| 3.24 | 8 | | | | |
| *3.11* | 10 | | | | |
| 2.97 | 6 | | | | |

Investigation carried out in the electron microscope shows that a pigment produced in the manner described above in accordance with the example described contains mainly particles within the size ranges 0.04 to 0.1μ.

Under the influence of organic solvents particularly aromatic solvents such as toluene and xylene the delta pigment will in some cases recrystallize thereby producing more or less needle-shaped particles having a maximum length of about 40μ. This is the same phenomenon which often occurs in the case of pigments having the alpha structure.

The fastness to light is as excellent as in the case of the beta and alpha forms and the other fastnesses are also excellent.

We claim:
1. The delta-modification of particulate copper phthalocyanine pigment consisting of particles of crystalline structure substantially within the size range of 0.04 to 0.1 micron and having an X-ray diffraction pattern in which the most intense lines correspond to interplanar spacings of 12.0; 9.55; 6.24; 5.18; 5.07 and 3.11 A.

2. The method of producing the delta-modification of copper phthalocyanine pigment comprising
   (A) partly neutralizing sulphuric acid with urea in an amount providing a molecular ratio of urea to sulphuric acid of between 2.0 and 4.0; and
   (B) milling raw copper phthalocyanine with the neutralized sulphuric acid and with sodium chloride in the proportions, by weight, of 1:0.5 to 2:2 to 6, respectively, for a period of 6 to 36 hours.

References Cited in the file of this patent

UNITED STATES PATENTS 3,051,721    Pfeiffer            Aug. 28, 1962

OTHER REFERENCES

Ebert et al.: Jour. Amer. Chem. Soc. (vol. 74), (1952), pp. 2806–2810.

Suito et al.: Proc. Japanese Acad. (vol. 33), (1917), pp. 398–402.

Venkataraman: Synthetic Dyes, Academic Press, New York (1952), p. 1120. TP913.V4.

Buckley: Crystal Growth, Wiley and Sons, New York (1951), pp. 344 and 345. QD 905.B95.

Weissberger (Ed.): Technique of Org. Chem., Interscience Pubs. Inc., New York, vol. III (1950), pp. 384–387, QD 251.W44.